(12) United States Patent
Danebergs et al.

(10) Patent No.: US 11,097,386 B2
(45) Date of Patent: Aug. 24, 2021

(54) POWER TOOL WITH POSITION CONTROL

(71) Applicant: ATLAS COPCO INDUSTRIAL TECHNIQUE AB, Stockholm (SE)

(72) Inventors: Andris Danebergs, Svärdsjö (SE); Rickard Sven Gunnar Molin, Kista (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 0 days.

(21) Appl. No.: 15/535,037

(22) PCT Filed: Aug. 7, 2015

(86) PCT No.: PCT/EP2015/068284
§ 371 (c)(1),
(2) Date: Jun. 10, 2017

(87) PCT Pub. No.: WO2016/091404
PCT Pub. Date: Jun. 16, 2016

(65) Prior Publication Data
US 2017/0326695 A1    Nov. 16, 2017

(30) Foreign Application Priority Data

Dec. 10, 2014 (SE) .................................. 1451504-3

(51) Int. Cl.
*B23P 19/06* (2006.01)
*B25B 23/00* (2006.01)
(Continued)

(52) U.S. Cl.
CPC ............. *B23P 19/06* (2013.01); *B23P 19/069* (2013.01); *B25B 21/00* (2013.01); *B25B 23/00* (2013.01);
(Continued)

(58) Field of Classification Search
CPC ........ B23P 19/06; B23P 19/069; B25B 21/00; B25B 23/00; B25B 9/00; B25B 5/068; B25D 3/00
(Continued)

(56) References Cited

U.S. PATENT DOCUMENTS 3,739,659 A * 6/1973 Workman, Jr. ....... B25B 21/008
475/266
4,813,312 A 3/1989 Wilhelm
(Continued)

FOREIGN PATENT DOCUMENTS

CN    102209611 A    10/2011
JP    61061127 U    4/1986
(Continued)

OTHER PUBLICATIONS

International Search Report (ISR) and Written Opinion dated Nov. 24, 2015 issued in International Application No. PCT/EP2015/068284.
(Continued)

*Primary Examiner* — Joseph J Hail
*Assistant Examiner* — Katina N. Henson
(74) *Attorney, Agent, or Firm* — Holtz, Holtz & Volek PC

(57) ABSTRACT

A repositionable power wrench includes a housing, a motor arranged inside the housing, and an output shaft, which is rotationally connected to the motor and telescopically arranged with respect to the housing to allow axial movement of the output shaft with respect to the housing between a fully extended position ($E_{max}$) and a fully compressed position, with a resilient member being arranged to urge the output shaft towards the fully extended position ($E_{max}$). The power wrench also includes or is connectable to a positioning system arranged to monitor a position of the power wrench. The output shaft includes an output end arranged to
(Continued)

interact with a fastener. A sensor is arranged to monitor a level of extension (E) of the output shaft with respect to the housing, such that the position of the output end of the output shaft may be determined.

14 Claims, 2 Drawing Sheets

(51) Int. Cl.
  *B25B 21/00* (2006.01)
  *B25B 9/00* (2006.01)
  *B25D 3/00* (2006.01)
  *B25B 5/06* (2006.01)
(52) U.S. Cl.
  CPC .................. *B25B 5/068* (2013.01); *B25B 9/00* (2013.01); *B25D 3/00* (2013.01)
(58) Field of Classification Search
  USPC .......................................... 81/467, 469, 487
  See application file for complete search history.

(56) References Cited

U.S. PATENT DOCUMENTS

| | | |
|---|---|---|
| 8,857,532 B2 | 10/2014 | Wallgren |
| 2003/0037423 A1 | 2/2003 | Siegel |
| 2011/0214890 A1* | 9/2011 | Wallgren ................ B25B 23/14 173/2 |
| 2013/0175065 A1 | 7/2013 | Terada et al. |
| 2014/0288712 A1 | 9/2014 | Ogasawara et al. |

FOREIGN PATENT DOCUMENTS

| | | | |
|---|---|---|---|
| JP | 02083123 | | 3/1990 |
| JP | H06304826 A | | 11/1994 |
| JP | H07223130 | * | 7/1995 ............. B23P 19/06 |
| JP | 07223130 A | | 8/1995 |
| JP | H0839372 A | | 2/1996 |
| JP | 2005121132 A | | 5/2005 |
| JP | 2012223841 A | | 11/2012 |
| JP | 2014180719 A | | 9/2014 |

OTHER PUBLICATIONS

Japanese Office Action (and English language translation thereof) dated Feb. 17, 2020 issued in Japanese Application No. 2017-531280.
Chinese Office Action dated Mar. 26, 2019 issued in Chinese Application No. 201580066488.0.
Japanese Office Action dated Apr. 22, 2019 (and English language translation thereof) issued in Japanese Application No. 2017-531280.
Japanese Office Action dated Aug. 13, 2019 (and English language translation thereof) issued in Japanese Application No. 2017-531280.

* cited by examiner

POWER TOOL WITH POSITION CONTROL

The invention relates to a repositionable power wrench with a telescopically arranged output shaft. Specifically, the invention relates to such a tool with an improved functionality with respect to the interaction with a fastener.

BACKGROUND

Repositionable power wrenches are used to automatically tighten fasteners, such as screws, at a high speed. Such power wrenches are automatically located at a fastener to be tightened, wherein several fasteners may be tightened continuously as the power wrench is repositioned between different locations and/or fasteners are conveyed past the power wrench. Normally a set of power wrenches are arranged on a common structure to tighten a number of bolts simultaneously, one wrench per bolt. The common structure is moved in and out of operation position as new work being conveyed in and out of position next to the common structure. As an alternative, the work pieces may also be moved laterally towards the power wrenches, such that the structure holding the power wrenches may remain static.

Often power wrenches of the above type are furnished with a spring loaded telescopic output shaft that allows the output end of the wrench to follow the axial movement of the fastener as it is tightened. Hence, it suffices that the power wrench is located within a specific range in the axial direction of the fastener for the output end of the power wrench to follow the fastener throughout the whole tightening operation.

Several similar power wrenches may be arranged on a common structure at different locations and heights to tighten bolts arranged at corresponding locations and heights on the work piece. Each wrench is adapted to tighten a bolt of a specific length at a specific location and at a specific axial height. The telescopic output shaft is adapted to accept axial tolerances that might exist between different work pieces and bolts for each specific power wrench.

The flexibility provided by the telescopic output shaft is also useful in that it allows fasteners of different length to be tightened with the same power wrench.

In some applications it is however important that a fastener of a specific length is used at a specific location. In such cases it may be of interest to estimate the length of the fasteners in some manner.

A method of controlling the length of a fastener is disclosed in US 2003/0037423 A1. According to this method the length of the fasteners may be estimated from a "Screw Insertion Signature" representing the vibration over time of the tool during a tightening operation. A problem related to such a method is however that it may be difficult to deduce when the output shaft reaches contact with the fastener. It is however not always the case that the rotation of the output shaft corresponds exactly to the productive rotation of the fastener. In some occasions the output shaft may rotate before it reaches an engaging contact with the fastener and sometimes the fastener may rotate without being correctly inserted into the threaded hole in which it should be tightened. Hence, from the curve showing the vibration it may be difficult to retract the exact point in time when the fastener starts to rotate threadedly engaged with the joint on the work piece and therefore it may be difficult to deduce the length of the fastener. Further, the length of the fastener may only be estimated after a completed tightening operation, not at the initial phase of the tightening operation.

In JP 2012-223841 A an automatic screw tightening device is disclosed. The screw tightening device is adapted to note the absence of a screw such that a tightening operation may be aborted and such that the bit will not come into contact with the screw hole so as to damage the screw hole. This is achieved in that the position of the bit is monitored so as to abort an operation when a screw is not encountered at an expected position. The device may also be adapted to note if a screw of an insufficient length has been provided at a specific location.

A problem with the device described in JP 2012-223841 A is that the bit is in butt contact with the screw. This demands a very high precision in order to allow the bit to be in constant contact with the screw without pushing it too hard so as to damage the screw, the threads, or the joint.

Hence, there is a need of a power wrench that is flexible but that offers the possibility of monitoring the length of a tightened screw in a reliable manner.

SUMMARY OF THE INVENTION

An object of the invention is to provide a power wrench with a telescopically arranged output shaft that allows a high degree of control of a tightening process.

This object is achieved by a repositionable power wrench including a housing, a motor arranged inside said housing, and an output shaft, which is rotationally connected to the motor and which is telescopically arranged with respect to the housing to allow axial movement of the output shaft with respect to the housing between a fully extended position and a fully compressed position. The power wrench further comprises or is connectable to a positioning system arranged to monitor the position of the power wrench. A resilient member is arranged to urge the output shaft towards the fully extended position. And the output shaft comprises an output end arranged to interact with a fastener, a sensor being arranged to monitor a level of extension of the output shaft with respect to the housing, such that the position of the output end of the output shaft may be determined.

Due to the fact that the output shaft is telescopically arranged with respect to the housing and provided with a sensor for determining the level of extension of the output shaft it is possible to deduce the exact position of the output end, while still allowing it to adaptively follow the position of the fastener on the work piece it is about to tighten.

Thereby, a gentle and smooth contact is achieved without jeopardizing the closeness of said contact, and with the possibility to monitor the operation.

Other features and advantages of the invention will be apparent from the figures and from the detailed description of the shown embodiment.

SHORT DESCRIPTION OF THE DRAWINGS

In the following detailed description reference is made to the accompanying drawings, of which:

DETAILED DESCRIPTION OF THE SHOWN EMBODIMENT OF THE INVENTION

Figure 1:
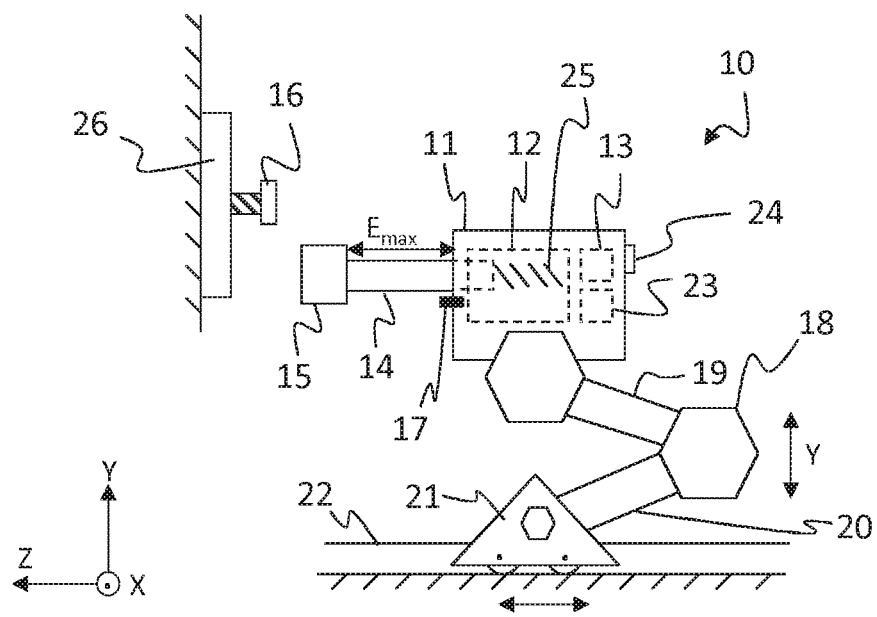
FIG. 1 shows a schematic view of a repositionable torque wrench according to a specific embodiment of the invention.
Figure 2:
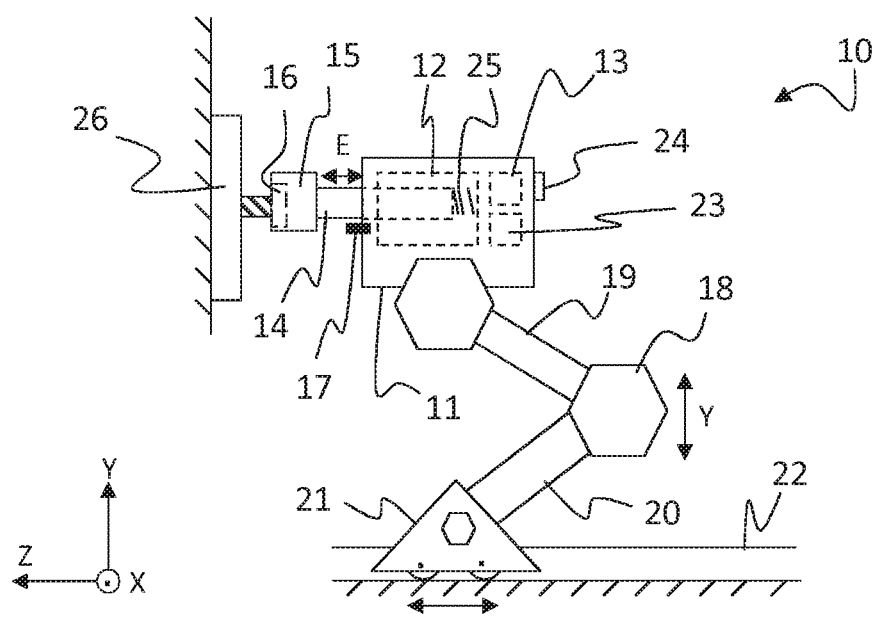
FIG. 2 shows a schematic view of the repositionable torque wrench in FIG. 1 in an operational position.

In FIGS. 1 and 2 a repositionable torque wrench 10 according to a specific embodiment of the invention is shown.

The repositionable torque wrench 10 includes a housing 11 inside which a motor 12 is arranged. Further, a positioning system 13 is provided to monitor the position of the power wrench 10.

An output shaft 14 is rotationally connected to and driven by the motor 12 and is telescopically arranged with respect to the housing 11 to allow axial movement of the output shaft 14 with respect to the housing 11. The output shaft 14 is extendable between a fully extended position $E_{max}$ (shown in FIG. 1) and a fully compressed position $E_{min}$, wherein a resilient member 25 is arranged to urge the output shaft 14 towards the fully extended position $E_{max}$.

The output shaft 14 comprises an output end 15, typically a socket, arranged to interact with a fastener 16, such as a screw, bolt or nut. The fastener 16 is arranged in a workpiece 26. A sensor 17 is arranged to monitor a level of extension E of the output shaft 14 with respect to the housing 11, such that the position of the output end 15 of the output shaft 14 may be determined. The sensor 17 may e.g. be a hall sensor, an inductive sensor, or a capacitive sensor.

In a typical embodiment the motor 12 drives a motor shaft (not shown) that is connected via splines to the output shaft 14. The resilient member 25 is in such a case arranged to urge the output shaft 14 towards a fully extended position with respect to the motor shaft. Further, one or a plurality of gears, such as one or many planetary gears, may be arranged between the motor 12 and the output shaft 14.

In the shown embodiment the power wrench 10 is movable by means of a holder 18. The holder includes two linked legs 19 and 20 which allows the power wrench 10 to be moved upwards and downwards, i.e. in the Y-direction of the shown 3D-coordinate system. A base portion 21 of the holder is arranged on a rail 22. In the shown embodiment the base portion 21 may be moved in a Z-direction along said rail 22. Typically though, the base portion 21 may be arranged to be moved also in the X-direction, in and out of the figures, to move between different work stations and/or a fasteners 16, such as screws, bolts or nuts. The positioning system 13 is arranged to continuously monitor the current position of the power wrench housing 11, and, with the addition of the sensor 17 that monitors the level of extension E of the output shaft 14, the position of the output end 15 of the output shaft 14 may be continuously monitored.

In FIG. 1 the output shaft 14 is unaffected by outer factors such that the output shaft 14 is located an its outermost position $E_{max}$. In FIG. 2 the power wrench has been moved upwards by the legs 19 and 20 and forward in the z-direction towards the fastener 16 by means of the base portion 21 that has moved along rail 22. Due to the precise movement of the power wrench 10 the output end 15 of the output shaft 14 has arrived into mating contact with the fastener 16 and as a result the output shaft 14 has been compressed to a level of extension E that is within the interval of maximum extension $E_{max}$ and minimum extension $E_{min}$. As the tightening operation is performed and the fastener 16 is tightened the output shaft 14 will be continuously extended such that the output end 15 will follow the fastener 16 axially on its way inwards into the joint on the workpiece 26.

In the shown embodiment the power wrench 10 further comprises a control unit 23 adapted to compare the position of the output end 15 of the output shaft 14 with a predefined position of said output end 15. The control unit 23 and the positioning system 13 may however just as well be located outside of and at a distance from the power wrench 10. In such a case the power wrench 10 will need to be connectable to the control unit 23 and the positioning system 13, e.g. by means of wires or a wireless connection such as IR, Bluetooth, or the like. Such connection is obvious to a person skilled in the art and will not be described in detail in this specification.

An indication unit 24 is arranged to alert an operator or an automated system if the position of the output end 15 of the output shaft 14 does not correspond to the predefined position of said output end 15. The indication unit 24 may be arranged on the power wrench housing 11 or at a distance from the same. The purpose of the indication unit 24 is to alert the operator or an automated system such that a proper action may be taken. Hence the indication unit 24 is located such that it will be noticed by the operator. Further, in a specific embodiment of the invention, the indication unit 24 only registers the status of each work operation, such as a tightening of a fastener, wherein each operation will be traceable and wherein operations of questionable quality may be indicated. In such an embodiment all operations may be completed regardless of quality, wherein the quality of each operation is registered such that a later action may be taken.

Typically, the control unit 23 of the power wrench 10 is configured to allow a specific operation to start only when the level of extension E of the output shaft 14 with respect to the housing 11 is within a predetermined range $E_{min}$–$E_{max}$. This is useful in cases where the lengths of the fasteners vary and where a specific length of a fastener is expected at a certain position. If a screw is encountered at a position that signals that the current screw does not correspond the expected length the operation may aborted. Namely, if a screw of incorrect length is tightened at a faulty position, problems may occur. If the screw is too short the joint may not be fully tightened, and if the screw is too long the joint may be destroyed as the screw may risk reaching too far on the back side of the joint.

Screws of incorrect length may be located at positions where they are not intended because the provision of screws is often a manual work performed by a person working on a moving belt under stressful conditions. Over time a few screws may end up at a faulty position. With the inventive power wrench problems due to such incorrect positioning may be avoided in that a tightening operation maybe aborted when a fastener of incorrect length is encountered and before the tightening operation is completed, such that the joint is not damaged.

The positioning system 13 may be configured to provide information regarding the location of the power wrench housing 11 with respect to a fastener 16. The monitored level of extension of the output shaft 14 with respect to the housing 11 by the sensor 17 is added to said information so as to obtain a correct axial position of the output end 15 of the output shaft 14.

The control unit 23 is adapted to compare an actual position of the output end 15 of the output shaft 14 when a fastener 16 is encountered with an expected position and to alert an operator of the tool if said actual position does not correspond to said expected position.

The control unit may be adapted to control a fastening operation based on the monitoring of the level of extension E of the output shaft 14 and to adapt the angular velocity of the output shaft based on said monitoring.

Namely, in order to keep a tightening operation as short in time as possible it is desired to uphold a high angular velocity during a running down phase of the tightening operation. A problem is however that the delivered torque may be overshot. This is particularly troublesome when tightening hard joints where the fastener is only rotated a fraction of a lap, e.g. 30-60 degrees, during the torque building phase. In such cases it will be too late to start decelerating the motor in response to an increased torque and the target value (torque, angle, or the like) will likely be overshot, whereby undesired and possibly harmful tensions may be incurred.

Namely, in the prior art the tightening operation is either governed by feedback of the delivered torque value and/or by feedback of the angular position of the output shaft. This may, as explained above, not be enough, since the torque is increasing only in the very last part of the tightening operation and since the monitored angular position may be incorrect.

By monitoring the level of extension E the output shaft 14 it will be possible to obtain a more reliable indication on the progress of the tightening operation. For a known fastener it will be known how long the running down portion of the fastener is and as a consequence at what point of extension E of the output shaft 14 the torque will start to increase, such that the angular velocity may be lowered before that point.

In other words the control unit may be adapted to make sure that a high angular velocity is provided during a first phase of the fastening operation and that the angular velocity is lowered as the fastening operation is close to a set target value, based on the monitoring of the extension E of the output shaft 14.

Figure 3:
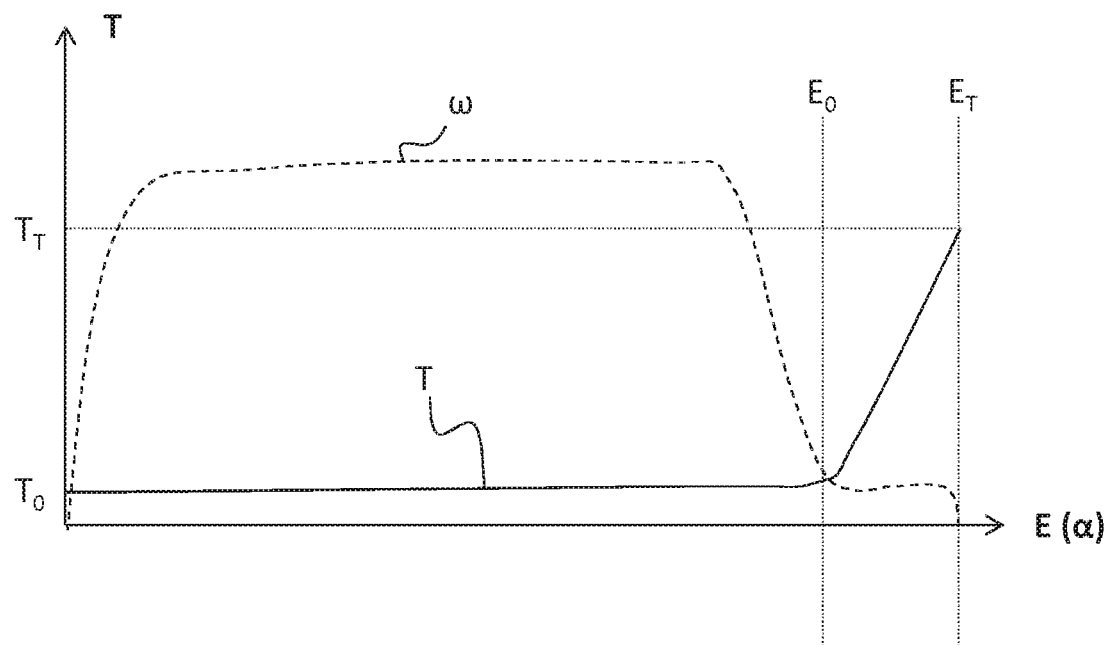
FIG. 3 shows a representation of a delivered torque to fastener rundown during a typical tightening operation.

This is indicated in FIG. 3, where the torque T is shown in function of the extension E of the output shaft 14 and of the angular position α of the fastener. The extension E of the output shaft 14 is defined as being proportional to the rundown of the fastener and to the angular position α of the fastener for the part where the threads of the fastener are engaged with the threads of the joint. If the fastener rotates without engagement with the joint no extension E of the output shaft 14 is produced. The arrangement in accordance with the invention may be adapted to detect such non-productive rotation and particularly the monitoring of the level of extension of the output shaft will be enough to monitor the position of the fastener.

The torque T during an initial phase of the rundown is very low and relatively constant at an initial torque $T_0$. At the end of the initial phase the fastener arrives at a point where the torque starts to increase. At this point the output shaft 14 has reached the level of extension $E_0$. After this point the torque T will start to increase towards the target torque $T_T$ as a clamp force is building up in the joint between the fastener and the work piece.

An object of the invention is to uphold a high angular velocity ω of the output shaft for as long as possible during the tightening operation without risking to overshoot the target torque $T_T$. Typically, the angular velocity ω should be held as high as possible during the major part of the rundown phase.

By monitoring the level of extension E of the output shaft it will now be possible to uphold the angular velocity ω during the major part of the running down phase and still reduce the angular velocity ω well in time before the target torque $T_T$ has been met. This is typically achieved by starting to reduce the angular velocity ω before the level of extension $E_0$ where the torque starts to increase.

According to one aspect the invention is based on the fact that the difference of the level of extension of the output shaft during a tightening operation corresponds to the axial travel of the fastener. In some cases the power wrench 10 is however moved during the tightening operation, in order to follow the movement of the fastener that is being tightened. In such a case the level of extension E of the output end of the output shaft will have to be compensated for any movement of the power wrench 10 in order to calculate the axial travel of the fastener. This travelled path of the fastener is hence estimated from a point where a correct contact has been established between the output end 15 of the output shaft 14 and the fastener 16 to the current position of the output end 15 of the output shaft.

In other words the position of the power wrench 10 with respect to the fastener 16 and the work piece 26 is monitored by monitoring the actual position of the output end 15 of the output shaft 14. This is done by monitoring both the position of the power wrench and the level of extension E of the output shaft 14. The registered position of the output end 15 is further compared to a known position at which the fastener 16 is close to being fully tightened. The control unit may in such a case be configured to reduce the angular velocity at a specific position of the output end 15 of the output shaft 14, corresponding to a position close to the target position of the tightening operation but sufficiently far away to allow the tightening operation to be concluded without overshooting the target torque.

Figure 4:
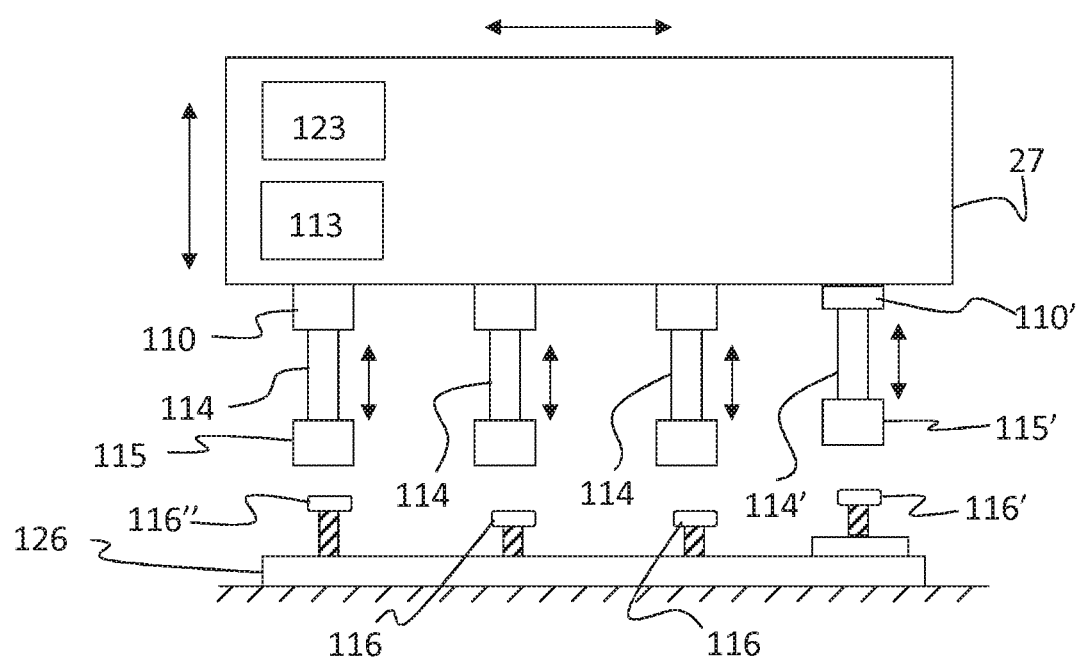
FIG. 4 shows a schematic view of a structure including multiple torque wrenches according to a specific embodiment of the invention.

In FIG. 4 a typical embodiment of the invention is shown. In this embodiment a plurality of wrenches 110, 110' are arranged on a common structure 27 with individual telescopic output shafts 114, 114'. The common structure 27 is lowered towards a work piece 126 with a plurality of fasteners 116, 116 to be tightened, or the work piece is raised towards the common structure 27. The wrenches 110, 110' may be individually operated, or may be operated all at once. A positioning system 113 and a control unit 123 may be arranged to monitor the position of the output end 115, 115' of each output shaft 114, 114'. These individual power wrenches 110, 110' have the same functionality as the power wrench 10 described with reference to FIGS. 1 and 2 and may be separately controlled during a tightening operation involving a plurality of power wrenches and fasteners.

In the shown embodiment the power wrench 110' at the right side of FIG. 4 is individually adapted for a fastener 116' that is located at a different height than the rest of the fasteners 116. With the individual adaptation of this power wrench 110' the output end 115' will have an initial position with respects to the fastener 116' that corresponds to the mutual position between the other output shafts 114 and the corresponding fasteners 116, such that a similar span of flexibility is provided for each fastener. The fastener 116" provided on the left in FIG. 4 is somewhat longer than the other fasteners. This may be on purpose or not, and the span of the output shaft 114 may be arranged to be sufficient for any type of joint. In accordance with the invention the positioning system will note, with help from monitoring of the extension of the output shaft 114, when the output end 115 reaches the fastener 116" and alert the operator or an automatic system if the fastener 116" is encountered at a location that indicate that it is not correct length.

Above, the invention has been described with reference to a specific embodiment. The invention is however not limited to this embodiment. It is obvious to a person skilled in the art that the invention comprises further embodiments within its scope of protection, which is defined by the following claims.

The invention claimed is:

1. A repositionable power wrench comprising:
a housing;
a motor arranged inside the housing; and
an output shaft, which is rotationally connected to the motor and telescopically arranged with respect to the housing to allow axial movement of the output shaft with respect to the housing between a fully extended position ($E_{max}$) and a fully compressed position, with a resilient member being arranged to urge the output shaft towards the fully extended position ($E_{max}$), the output shaft comprising an output end configured to interact with a fastener to be tightened;
a sensor arranged to monitor a level of extension (E) of the output shaft with respect to the housing;
a positioning system configured to monitor a position of the power wrench and to combine information on the position of the power wrench with information on the level of extension of the output shaft monitored by the sensor to obtain a position of the output end of the output shaft; and
a control unit configured to start a specific operation only when the level of extension (E) of the output shaft with respect to the housing is within a predetermined range,
wherein the control unit is configured to compare the position of the output end of the output shaft with a predefined position of said output end, and
wherein the control unit is configured to monitor a fastening operation from the monitoring of the level of extension (E) of the output shaft and to adapt an angular velocity of the output shaft based on said monitoring.

2. The power wrench according to claim 1, wherein an indication unit is configured to alert if the position of the output end of the output shaft does not correspond to the predefined position of said output end.

3. The power wrench according to claim 1, wherein the positioning system is configured to provide information regarding a location of the power wrench with respect to the fastener.

4. The power wrench according to claim 1, wherein the control unit is configured to perform control such that a high angular velocity is provided during a first phase of the fastening operation and such that the angular velocity is lowered as the fastening operation is close to a set target value ($E_T$).

5. The power wrench according to claim 1, wherein:
the motor drives a motor shaft that is connected via splines to the output shaft; and
the resilient member is arranged to urge the output shaft towards a fully extended position with respect to the motor shaft.

6. The power wrench according to claim 1, wherein the sensor is a hall sensor, an inductive sensor, or a capacitive sensor.

7. The power wrench according to claim 2, wherein the positioning system is configured to provide information regarding a location of the power wrench with respect to the fastener.

8. The power wrench according to claim 2, wherein the control unit is configured to perform control such that a high angular velocity is provided during a first phase of the fastening operation and such that the angular velocity is lowered as the fastening operation is close to a set target value ($E_T$).

9. The power wrench according to claim 3, wherein the control unit is configured to compare an actual position of the output end of the output shaft when the fastener encounters an expected position and to alert an operator of the power wrench if said actual position does not correspond to said expected position.

10. The power wrench according to claim 7, wherein the control unit is configured to compare an actual position of the output end of the output shaft when the fastener encounters an expected position and to alert an operator of the power wrench if said actual position does not correspond to said expected position.

11. A power wrench system comprising:
(i) a repositionable power wrench comprising:
a housing;
a motor arranged inside the housing; and
an output shaft, which is rotationally connected to the motor and telescopically arranged with respect to the housing to allow axial movement of the output shaft with respect to the housing between a fully extended position ($E_{max}$) and a fully compressed position, with a resilient member being arranged to urge the output shaft towards the fully extended position ($E_{max}$), the output shaft comprising an output end configured to interact with a fastener to be tightened;
a sensor arranged to monitor a level of extension (E) of the output shaft with respect to the housing;
(ii) a positioning system configured to monitor a position of the power wrench and to combine information on the position of the power wrench with information on the level of extension of the output shaft monitored by the sensor to obtain a position of the output end of the output shaft; and
(iii) a control unit configured to start a specific operation only when the level of extension (E) of the output shaft with respect to the housing is within a predetermined range,
wherein the housing of the power wrench is movable along at least two axes that are perpendicular to each other, in a three-dimensional coordinate system.

12. The power wrench system according to claim 11, comprising a plurality of the power wrenches arranged on a common structure, the control unit being configured to compare the position of the output end of the output shaft of each power wrench with a predefined position of each respective output end.

13. A method of monitoring a position of an output end of a telescopic output shaft of a repositionable power wrench, the method comprising:
monitoring a position of the power wrench;
monitoring, by a sensor provided to the power wrench, a level of extension (E) of the output shaft with respect to a housing of the power wrench;
combining information on the position of the power wrench with information on the level of extension of the output shaft monitored by the sensor to obtain the position of the output end of the output shaft; and
controlling the power wrench to start a specific operation only when the level of extension (E) of the output shaft with respect to the housing is within a predetermined range,
wherein the power wrench is movable along at least two axes that are perpendicular to each other, in a three-dimensional coordinate system.

14. A repositionable power wrench comprising:
a housing;
a motor arranged inside the housing; and
an output shaft, which is rotationally connected to the motor and telescopically arranged with respect to the housing to allow axial movement of the output shaft with respect to the housing between a fully extended position ($E_{max}$) and a fully compressed position, with a resilient member being arranged to urge the output shaft towards the fully extended position ($E_{max}$), the output shaft comprising an output end configured to interact with a fastener to be tightened;

a sensor arranged to monitor a level of extension (E) of the output shaft with respect to the housing;

a positioning system configured to monitor a position of the power wrench and to combine information on the position of the power wrench with information on the level of extension of the output shaft monitored by the sensor to obtain a position of the output end of the output shaft; and a control unit configured to start a specific operation only when the level of extension (E) of the output shaft with respect to the housing is within a predetermined range, wherein the housing of the power wrench is movable along at least two axes that are perpendicular to each other, in a three-dimensional coordinate system.

* * * * *